(No Model.)
E. LUNKENHEIMER.
By judicial change of name now E. H. LUNKEN.
STRAIGHTWAY VALVE.
No. 494,582. Patented Apr. 4, 1893.
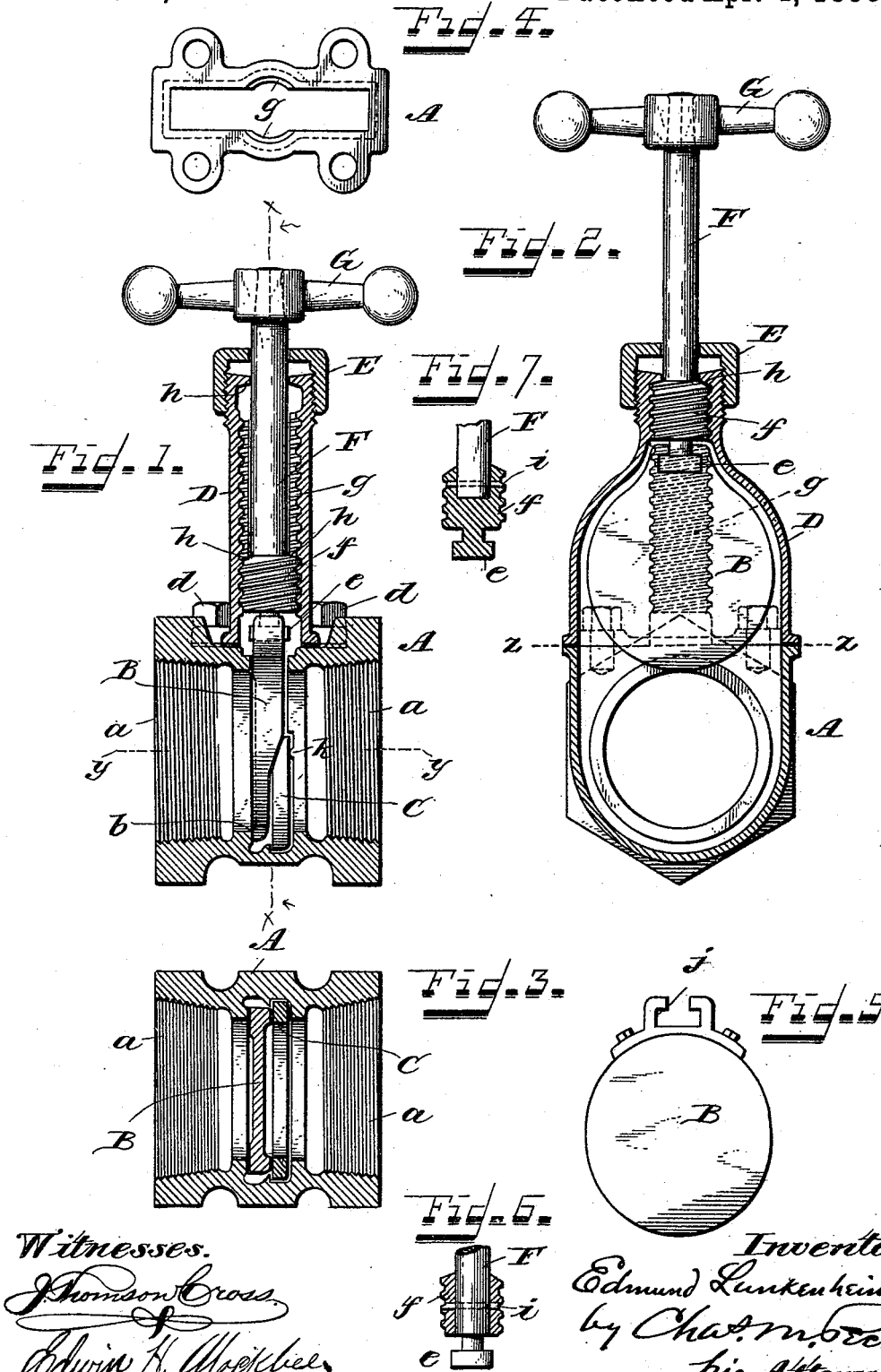

UNITED STATES PATENT OFFICE.

EDMUND LUNKENHEIMER, (BY JUDICIAL CHANGE OF NAME NOW EDMUND H. LUNKEN,) OF CINCINNATI, OHIO, ASSIGNOR TO THE LUNKENHEIMER COMPANY, OF SAME PLACE.

STRAIGHTWAY-VALVE.

SPECIFICATION forming part of Letters Patent No. 494,582, dated April 4, 1893.

Application filed July 21, 1892. Serial No. 440,731. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Straightway-Valves, of which the following is a full, clear, and exact description, reference being had to the accompanying drawings, forming part of this specification.

My invention relates to all classes of straight way valves whether employing single or double disks, and it has for its object the improved construction of the same whereby they are rendered more compact with a great saving of material.

The novelty of my invention will be hereinafter set forth and specifically pointed out in the claims.

In the accompanying drawings:—Figure 1 is a central section, in side elevation, of a valve embodying my invention and with the disk closed. Fig. 2, is an end elevation of the same on the dotted line $x\ x$ of Fig. 1 looking to the right, and with the disk entirely raised. Fig. 3 is a sectional plan view on the dotted line $y\ y$ of Fig. 1. Fig. 4 is an inverted plan view of the bonnet on the dotted line $z\ z$ of Fig. 2. Fig. 5 is an elevation of one of the disks for large valves. Fig. 6 is a sectional detail of the lower part of the stem under a modified form of construction. Fig. 7 is a corresponding view showing a further modification.

The same letters of reference are used to indicate identical parts in all the figures.

A is the body of the valve, of the usual or any suitable construction, with threaded pipe connections $a$ in line with each other and with the valve opening. In this instance I have shown but a single valve disk B which when lowered is forced uniformly and tightly to its seat $b$ by a self adjusting half ring C confined in a groove in the body of the valve and whose upper beveled ends engage inclined shoulders $c$ on the disk B. Any other means, however, might be employed to force the disk to its seat when lowered.

D is the bonnet of the valve secured to the body, with an intermediate packing, by bolts $d$ or in any other suitable manner. This bonnet is just of sufficient size to receive within it the valve disk, or disks, when entirely raised, as seen in Fig. 2, and to afford a sufficient extension at the top for a stuffing box whose cap nut E is screwed upon its exteriorly threaded end. The stem F of the valve, with a hand wheel G at its upper end, passes down through the stuffing box and bonnet and engages the upper end of the disk B by means of a head piece $e$ confined in a T shaped slot or opening in the disk. Just above the disk, the stem is enlarged in diameter for a short distance as at $f$ and this enlargement is threaded to engage sectional or part-nut threads $g$ in the opposite sides of the bonnet, or space that the disk occupies when raised, as shown more particularly in Figs. 1 and 4. The rest of the stem is entirely smooth and free from threads and only has a bearing through the stuffing box. While I have shown the threads or part-nuts for the valve stem as entirely within the bonnet, such is not the essence of my invention, for the space occupied by the disk or disks when open might be partly in the bonnet and partly in an upward extension of the valve body, in which case both would be provided with threads on opposite sides, or the bonnet as a separate piece might be dispensed with and a capped opening be provided in the bottom of the body for insertion of and access to the parts; for that thing, by which I am enabled to carry out my invention, consists, in providing threads for the engagement of the part $f$, whether integral or separate from the stem, in the space occupied by the disk or disks when raised to open the valve. By this construction the enlargement $f$ engaging the part-nuts causes the raising and lowering of the disk or disks when the stem is turned, as will be readily understood, and the stem and bonnet can be materially shortened, thereby saving much labor and material, while at the same time the valve is rendered lighter and much more compact than this class of valves has been heretofore made.

Another feature of my invention consists in forming a seat at $h$, Figs. 1 and 2, at the upper end of the bonnet, against which the upper side of the enlargement $f$ bears tightly when the valve is entirely opened, see Fig. 2, to enable the cap E to be removed and packing inserted without danger of leakage at that point.

In large valves of cast iron construction, the stem may be common bar iron, see Figs. 6 and 7, and the threaded enlargement $f$, preferably of brass, may have a central bore to enable it to be slipped on the stem where it is secured in any suitable manner, as by a pin $i$ inserted through it and the stem; or, as seen in Fig. 7, the head piece $e$ may be a part of the enlargement $f$ and the stem need not pass through the enlargement. Also in such constructions, as seen in Fig. 5, the T slot for the head piece $e$ may be in a separate malleable piece $j$ secured to the upper edge of the disk by bolts or in any suitable manner. This is done for the reason that in large cast iron constructions there would be danger of the lips of the T slot breaking off, if formed of cast iron integral with the disk. The projections $k$, Fig. 1, for engaging the upper ends of the half ring are in this instance integral with the body of the valve though they might be upon the rear sides of the half ring.

Having thus fully described my invention, I claim—

1. In a straight way valve, the combination with the body and its disk or disks, of a stem for operating the latter and having a threaded portion engaging threads formed in the recess occupied by the disk or disks when the valve is open.

2. In a straight way valve, the combination with the body and its disk or disks, of a stem for operating the latter having thereon a threaded portion engaging part-nuts on opposite sides of the space occupied by the disk or disks when the valve is open.

3. In a straight way valve, the combination of the body and its disk or disks, a stem for operating the latter and having a threaded portion thereon, and a bonnet having threads on its inner sides on opposite sides of the space occupied by the disk or disks when the valve is open and engaging the threaded portion of the stem, substantially as described.

4. In a straight way valve, the combination of the body and its disk or disks, a stem for operating the latter and having a threaded portion thereon, a bonnet having threads on its inner sides on opposite sides of the space occupied by the disk or disks when the valve is open and engaging the threaded portion of the stem, and a wedging half ring secured in the body to cause the tight seating of the valve when closed.

EDMUND LUNKENHEIMER.

Witnesses:
J. THOMSON CROSS,
E. H. MOCKBEE.